(No Model.)
G. W. RICHARDSON.
SAFETY VALVE FOR GAS, WATER, &c.
No. 291,013. Patented Dec. 25, 1883.
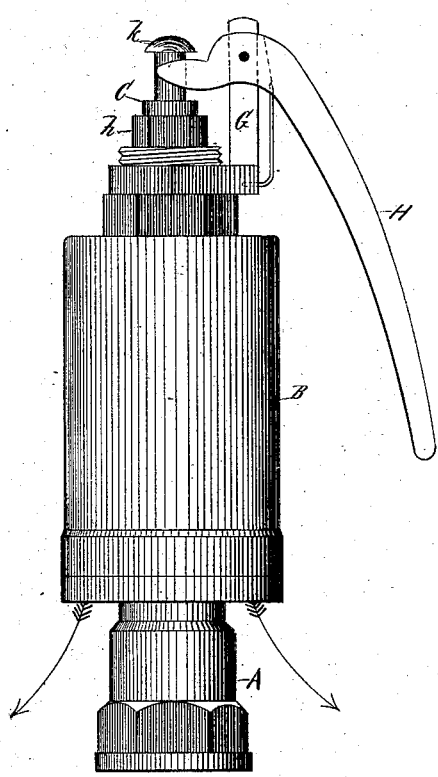
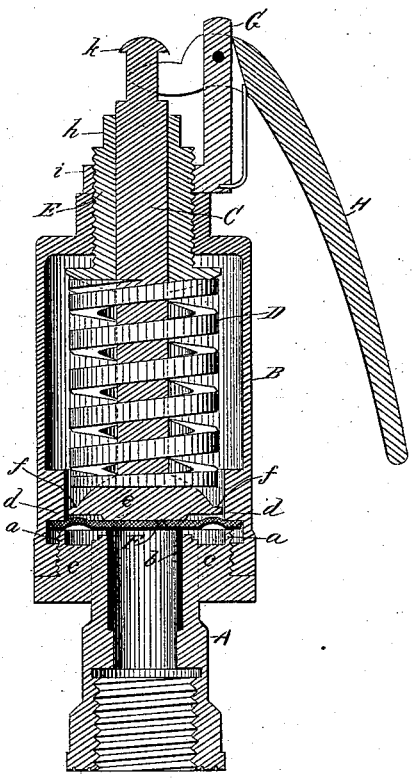
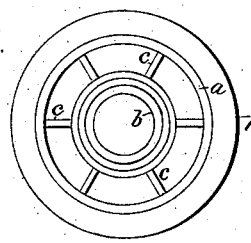
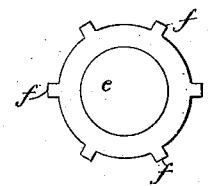
Witnesses:
John Buckler,
Henry Sieb,
George W. Richardson,
Inventor.
By North Osgood,
Attorney.

UNITED STATES PATENT OFFICE.

GEORGE W. RICHARDSON, OF BOSTON, MASSACHUSETTS, ASSIGNOR TO THE CONSOLIDATED SAFETY VALVE COMPANY, OF HARTFORD, CONNECTICUT.

SAFETY-VALVE FOR GAS, WATER, &c.

SPECIFICATION forming part of Letters Patent No. 291,013, dated December 25, 1883.

Application filed August 27, 1883. (No model.)

*To all whom it may concern:*

Be it known that I, GEORGE W. RICHARDSON, of Boston, county of Suffolk, and State of Massachusetts, have invented certain new and useful Improvements in Safety-Valves for Gas and Water or other Liquids, of which the following is a full, clear, and exact description, reference being had to the accompanying drawings, and to the letters of reference marked thereon.

My invention has relation to the construction and arrangement of a safety-valve for use in connection with water, liquids, or cold gases, as upon tanks containing soda or mineral waters charged with gas and under considerable pressure, but which may be used in other analogous situations.

The object of my invention is to produce a small, compact, and efficient safety-valve which shall be easy and inexpensive to manufacture, not liable to get out of order, durable, quickly operating to afford the required relief, having the working parts protected against the destroying effects of gases, in which the valve has no wings to present surfaces to be affected by the gases, as in ordinary constructions, and in which the opening protected by the valve shall be effectually closed against leakage of gas as soon as the tension of the spring is overcome by the pressure upon the valve. To accomplish this, my improvements involve certain novel and useful arrangements or combinations of parts, peculiarities of construction, and details of manufacture, all of which will be herein first fully described, and then pointed out in the claims.

In the accompanying drawings, forming part of this specification, Figure 1 is an elevation, and Fig. 2 an axial section, of a safety-valve constructed and arranged for operation in accordance with my invention. Fig. 3 is a plan of the base, the valve and valve-casing being removed therefrom. Fig. 4 is a plan of the under side of the spindle.

In all these figures like letters of reference, wherever they occur, indicate corresponding parts.

A is the base part of the safety-valve structure, which may be provided at bottom with a male or female screw for connecting it with the tank or reservoir. Upon this base-piece is screwed the casing B, which incloses the valve-spring and spindle. The screw-threaded seat $a$ for this casing extends up to about the level of the valve-seat $b$, and is united with the base-piece by a series of ribs $c\ c$, between which are openings for the free downward flow of escaping gas. The ribs $c$ are stopped a little short of the level of the valve-seat $b$, so as not to interfere with the movements of the valve or with the free outflow of gas. The seat $b$ is preferably in cylindrical form, and preferably made of some non-corrosive metal, separate from the base-piece, so that it may be removed and replaced when required, and so that it will resist the action of acids and gases thereon.

C is the valve-spindle, projecting up through the casing.

D is the tension-spring, and E is a hollow adjusting-screw for regulating the tension of the spring.

F is an elastic valve, consisting of a disk of rubber or other elastic gas and acid resisting material, made thick and strong enough for the purposes, and made to extend over the top of the collar $a$, whereon it is clamped and firmly held all around its margin by an annular ledge, $d$, on the interior of casing B, thus effectually closing all communication between the interior of the casing B and the space below the valve. The valve F rests upon the valve-seat $b$, and when firmly pressed thereon effectually closes the opening through said seat. The lower part of the valve-spindle is enlarged, as at $e$, and rests upon the elastic valve to press it down under the action of the spring. Upon this enlargement are a series of wings, $f\ f$, projecting radially therefrom and bearing against the inner wall of the ledge $d$, in order to guide the spindle in its up-and-down movements. Obviously, the wings might be cast on the inner surface of the case and bored out true, and the enlargement on the spindle left cylindrical to guide the spindle. The enlargement $e$ on the valve-spindle and the lower end of the adjusting-screw E are rounded to receive the ends of the spring, which ends are properly balled out. (I claim nothing herein on this means of mounting the spring, the same being made the subject of a separate patent.) The spring in this case might be otherwise mounted. The adjusting-screw, being properly turned down by the application of a suitable tool to its angular portion $h$, so as to bring the required tension on the spring, may be secured in place by the nut $i$ upon the bottom of the fulcrum, which will act as a set-nut. The fulcrum G for the testing-lever H is mounted upon or formed with the nut $i$. The projecting end of the valve-spindle has a head, $k$, under which the lever is made to bear. Such being the arrangement of the device, when applied in place, as soon as the pressure of gas or liquid within the tank is sufficient to overcome the tension of the spring, the valve rises from off its seat and the gas or liquid passes downward and outward through the opening between the ribs until the spring again closes the valve. The valve being elastic is always accurately seated.

It will be observed that the gas or liquid cannot find admission to the spring-chamber, and that the valve is used to close the escape-opening for gas or liquid as well as the bottom of the spring-chamber.

The parts of the device are all simple and easy to construct and assemble, and as a whole the device is found in practice to admirably answer the purposes and objects of the invention, as previously set forth. The elastic valve may be readily removed and replaced. Its under side, being comparatively smooth, presents no wings to the action of acids, &c., which wings upon the ordinary construction of safety-valves, are first to be attacked when used in positions where my improved valve is intended to be used. When used upon tanks containing water and other liquids, the valve and its seat are easily washed or freed of any sediment which might collect thereon. Upon soda-water tanks sulphuric acid and marble-dust are extremely liable to collect upon the valve and seat. These would quickly injure a valve of ordinary construction; but my improved valve will effectually withstand their deteriorating action.

When unscrewing the casing from the base, or screwing it on, or when adjusting the tension-screw, care should be taken to bear down on the lever to take the pressure of the spring off the seat so as not to injure the elastic valve by twisting the spindle thereon.

Having now fully described my invention, what I claim as new, and desire to secure by Letters Patent, is—

1. In a safety-valve of the character herein set forth, wherein the valve-spindle is guided at top and bottom within the walls of the spring-chamber, the spring-actuated elastic valve covering the lower mouth of the spring-chamber, and arranged to exclude fluids therefrom, substantially as explained.

2. The base-piece provided with the outlet for liquids or gases below the level of the valve-seat, the elastic valve resting upon said base-piece, and the spring-casing inclosing the spiral spring and valve-spindle, and arranged to clamp the margin of the valve upon its bearing, combined substantially as shown and described.

3. In combination with the elastic valve covering the lower mouth of the spring-casing, the valve-spindle guided at top and bottom within said casing, and having the enlarged lower portion with guiding-feathers thereon, arranged substantially as and for the purposes set forth.

4. In a safety-valve of the character herein set forth, the base-piece provided with a central opening, the removable valve-seat mounted therein, the spring-casing threaded thereon, and inclosing the spiral spring and valve-spindle, and the elastic valve, combined and arranged substantially as shown and described.

In testimony that I claim the foregoing I have hereto set my hand in the presence of two witnesses.

GEO. W. RICHARDSON.

Witnesses:
JOHN BUCKLER,
WORTH OSGOOD.